(12) United States Patent
Caleffi

(10) Patent No.: US 7,246,635 B2
(45) Date of Patent: Jul. 24, 2007

(54) AUTOMATIC FLOW RATE CONTROL VALVE

(75) Inventor: Marco Caleffi, Borgormanero (IT)

(73) Assignee: Caleffi S.p.A., Fontaneto D+Agogna (NO) (IT)

( * ) Notice: Subject to any disclaimer, the term of this patent is extended or adjusted under 35 U.S.C. 154(b) by 0 days.

(21) Appl. No.: 11/181,995

(22) Filed: Jul. 15, 2005

(65) Prior Publication Data

US 2006/0021658 A1    Feb. 2, 2006

(30) Foreign Application Priority Data

Jul. 29, 2004    (IT)  .......................... MI2004A1549

(51) Int. Cl.
*F16K 21/10* (2006.01)
*F16K 15/02* (2006.01)

(52) U.S. Cl. .................. 137/514.3; 137/504; 137/517; 137/514; 137/269

(58) Field of Classification Search ................ 137/514, 137/514.3, 504, 517, 543.21, 269
See application file for complete search history.

(56) References Cited

U.S. PATENT DOCUMENTS

| | | | |
|---|---|---|---|
| 4,074,693 A * | 2/1978 | Kates | 137/454.6 |
| 4,080,993 A * | 3/1978 | Lind, Jr. | 137/504 |
| 5,174,330 A | 12/1992 | Golestan et al. | |
| 5,178,324 A * | 1/1993 | Moesby | 237/8 R |
| 5,524,670 A | 6/1996 | Castle | |
| 5,931,191 A * | 8/1999 | Taube et al. | 137/594 |
| 6,311,712 B1 * | 11/2001 | Meyer | 137/8 |
| 6,532,987 B1 * | 3/2003 | Itoh et al. | 137/514.5 |

FOREIGN PATENT DOCUMENTS

GB    2 370 096    12/2000

* cited by examiner

*Primary Examiner*—Ramesh Krishnamurthy
(74) *Attorney, Agent, or Firm*—Young & Thompson

(57) ABSTRACT

An automatic flow rate control valve, includes a tubular body, defining a flow path between inlet apertures having a gradually variable cross-sectional area and a fluid outlet at one end; a flow control piston is axially movable within the tubular body, under opposite actions of the fluid pressure and a biasing spring, to choke the fluid inlet apertures, while maintaining a constant flow rate. The control piston is in the form of a first cup-shaped element sliding on a second cup-shaped element to define a hydraulic damping chamber, communicating with the flow path.

19 Claims, 4 Drawing Sheets

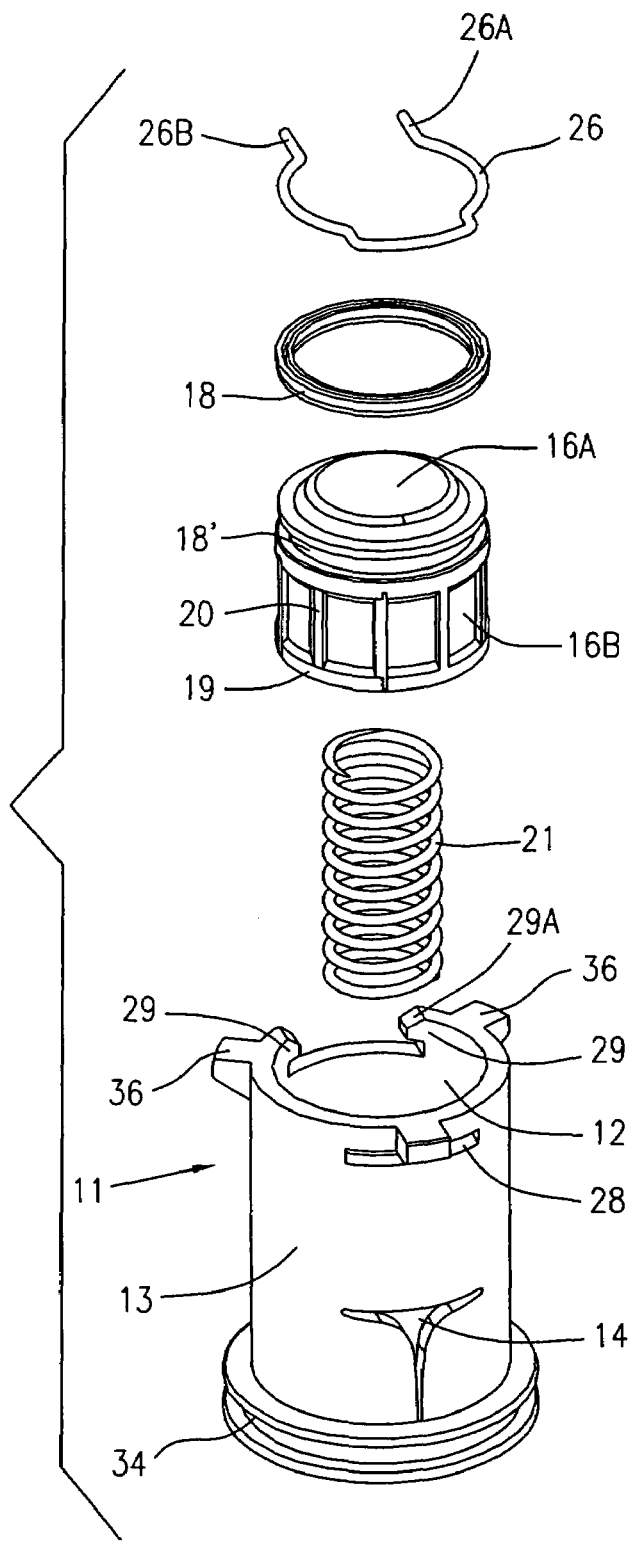
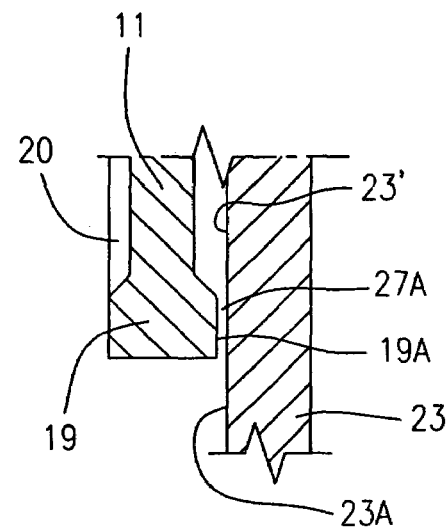
Fig. 4
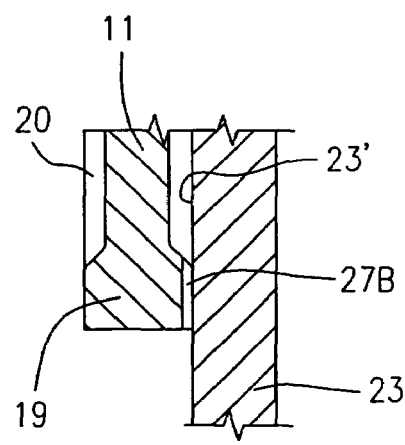
Fig. 5
Fig. 3

AUTOMATIC FLOW RATE CONTROL VALVE

BACKGROUND OF THE INVENTION

This invention refers to an automatic valve for controlling the flow rate of a hydraulic fluid; in particular it is directed to an automatic flow control valve and to a valve assembly to maintaining the flow rate of a fluid at a constant value, in response to pressure changes of the fluid.

STATE OF THE ART

As is known, in the hydraulic circuits for heating or air-conditioning systems connected to several users, it is necessary to provide for a stabilisation of the flow rates of the fluid, when changes of the pressure or certain functional parameters occur, so as to comply at all times with the design conditions of the plants; for example, pressure changes in the fluid supplied to individual users are liable to modify the flow rates and consequently the heat exchange with the environment.

A manual balancing of the flow rate, by means of special control valves, has not sufficiently solved the problem, in that the flow rates of the fluid in a system, for various reasons, can change in a wholly fortuitous manner.

In order to solve this problem, presently use is made of special automatic valves for stabilising and controlling the flow rates in the return piping of the circuit of each individual user.

These automatic valves for balancing and stabilising the flow rate comprise a tubular casing defining a passage between a fluid inlet and outlet of the valve.

A fluid control piston is movably disposed in an axial direction into the tubular casing, and is subjected to the opposite actions of the pressure of the fluid and of a biasing spring. The control piston is in the form of a hollow member having apertures for the passage of the fluid in a side wall, which gradually narrows towards the fluid inlet end; a supplementary flow aperture can be provided on a bottom wall of the control piston.

Such automatic flow rate control valves are shown, for example, in US 5,174,330, US 5,524,670, US 6,311,712 and GB 2 370 096.

Automatic control valves for stabilising the flow rates of a fluid, of the aforementioned type, have several problems and drawbacks in that, during their operation, as the fluid flow rate changes they can create pulsations and vibrations of the piston which give rise to irritating noise or which, at the most, can also damage the equipment of the individual users connected to them.

After a careful analysis and suitable tests, it was discovered that these phenomena are due not only to the changes in pressure and/or flow rate of the fluid in a system, but also to the structural and functional features of the valves themselves.

OBJECTS OF THE INVENTION

There is consequently a need to find new solutions for further improving the aforesaid valve devices.

Therefore, a main object of this invention is to provide an automatic flow rate control valve whereby it is possible to remedy the problems inherent in the automatic valves of the known type.

In particular, one object of the invention is to provide an automatic control valve for stabilising the flow rate of a pressurised fluid, in hydraulic systems, for example in heating and/or air-conditioning plants, whereby it is possible to eliminate or substantially reduce the causes of vibration and/or pulsation of the valve itself, and consequently the causes of generation of noise.

A still further object of the invention is to provide an automatic control valve of the aforementioned kind, which is structurally simple, of extremely limited cost, and obtainable by moulding of plastic material.

Another object of the invention is to provide a valve assembly comprising an automatic control valve for stabilising the flow rate, as mentioned previously, provided with a housing seat for the valve suitable to form a peripheral flow passage for the fluid towards an inlet aperture, or apertures of the valve, which is disposed around the body of the valve itself; in this way it is possible to provide the automatic flow rate control valve with suitable means for damping vibrations and/or pulsations.

BRIEF DESCRIPTION OF THE INVENTION

According to a first embodiment of the invention, an automatic control valve for stabilising the flow rate of a hydraulic fluid is provided, comprising:

a tubular valve body defining a flow passage between at least one inlet aperture and an outlet aperture in the tubular body;

a flow control piston, axially movable within said tubular body; and a biasing spring to urge the control piston in an open condition of the flow passage, against the pressure of the fluid, wherein said inlet aperture is provided on a outer side wall of the valve body, said inlet aperture longitudinally extending to the valve body towards the fluid outlet end; and in that the control piston comprises a cup-shaped element slidably movable between the outer side wall of the valve body and a coaxially arranged guide member having an inner wall which extends from the fluid outlet end into the piston member;

said piston member and guide member defining a piston damping chamber in communication with the internal flow passage of the control valve.

According to a further embodiment of the invention, a valve assembly has been provided comprising a tubular element member extending between an inlet and an outlet for the fluid, and a seating for housing said automatic flow control valve, said control valve being in the form of a cartridge removably disposable in the seating between said inlet and outlet for the fluid in the tubular element of the valve assembly.

BRIEF DESCRIPTION OF THE DRAWINGS

The automatic control valve according to the invention, and some examples of valve assemblies comprising the control valve, are shown in the following drawings, in which:

FIG. 3 shows an exploded view of the components forming part of the valve;

FIGS. 4 and 5 show two different details of FIG. 2;

DETAILED DESCRIPTION OF THE INVENTION

Figure 1:
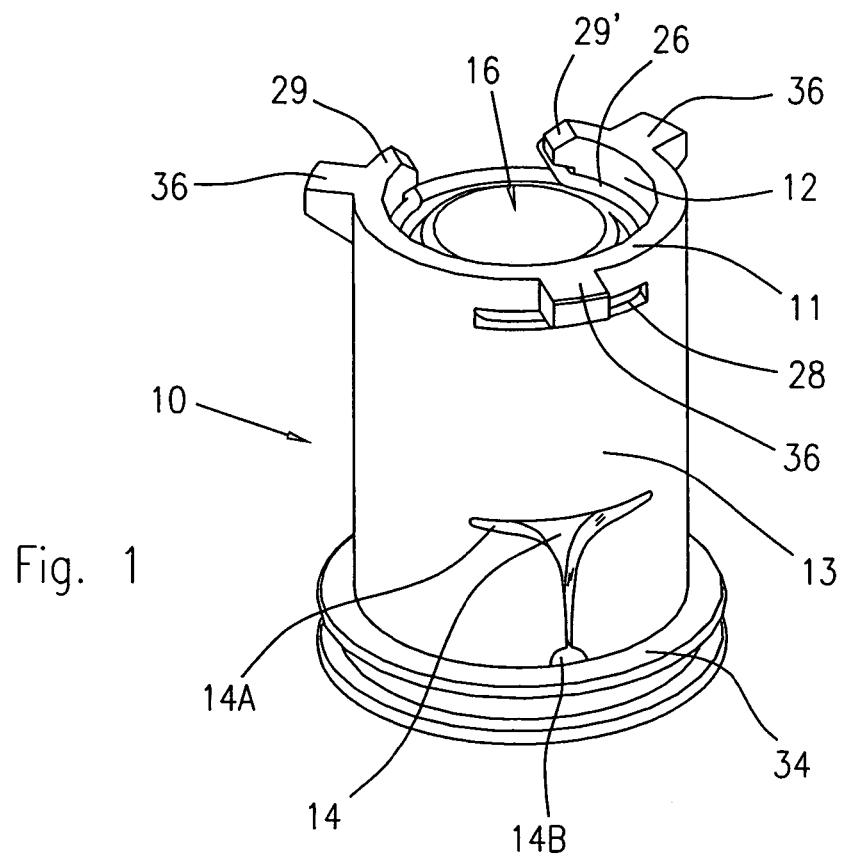
FIG. 1 shows a perspective view of the automatic control valve.
Figure 2:
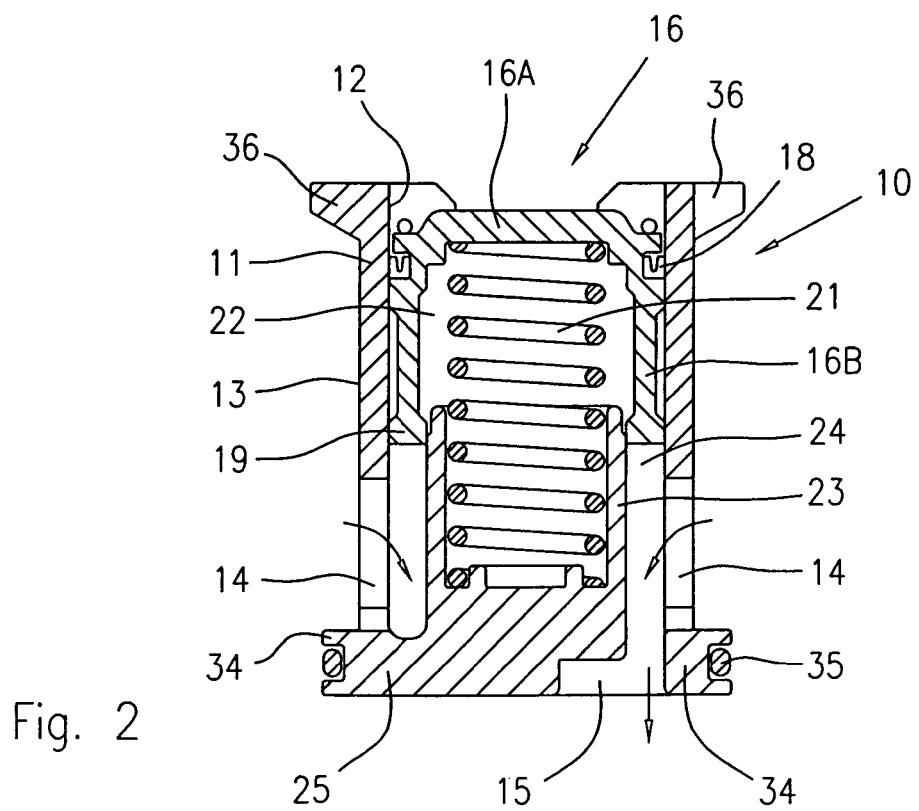
FIG. 2 shows a longitudinal cross-sectional view of the valve of FIG. 1.

As shown in FIGS. 1 and 2 and in the exploded view of FIG. 3, the automatic control valve for stabilising the flow rate of a hydraulic pressurised fluid, indicated as a whole by reference number 10, comprises a tubular body 11, of moulded plastic material, having a cylindrical side wall delimited by an internal surface 12 and an outer surface 13 which extend along the longitudinal axis of the tubular body 11 of the control valve.

One or more inlet apertures 14 are provided on the side wall 12 of the tubular body 11, close to the outlet 15, at the rear end of the body 11; in the event that more than one inlet apertures 14 are provided, they are angularly spaced apart from one another, and longitudinally extending towards the outlet aperture 15 at the rear end of the valve body 11.

The fluid inlet apertures 14, as shown in FIG. 1, are appropriately shaped with a variable outline configuration to achieve a constant flow rate at different pressure values, as explained further on.

In general, the geometrical shape of the outline of the inlet apertures 14, must be such that the progression of the flow area is gradually decreasing, according to a fluid mechanics relationship, specifically Bernulli equation for flow, starting from an area 14A of maximum flow passage, towards a small aperture 14B designed to allow the minimum flow rate required for a user.

In the case shown in FIG. 1, the aperture 14 has a substantially "T"-shaped profile, defined by two opposite curves, similar to hyperbolas, which converge towards the rear end of the valve body 11; however, the possibility of using other types of apertures 14, differing from the one shown, in relation to specific requirements or requests of a user, is not excluded to provide a controlled rate of the flow.

Inside the valve body 11, on the side opposite to the fluid outlet, a control piston 16 has been provided for controlling the flow rate of the fluid through the inlet apertures 14; the piston 16 is in the form of an up-down turned cup-shaped element, having a closed bottom wall 16A and a side wall 16B provided with sealing means to seal against the inside cylindrical surface 12 of the tubular body 11.

The sealing means comprise a lip seal 18 housed in an annular seat 18', FIG. 3; in a position opposite to the bottom wall 16A of the piston, an annular rib 19 has been provided to choke the flow area for the fluid through the inlet apertures 14 when the piston 16 is moved axially; a plurality of longitudinal ribs 20, see FIG. 3, extend longitudinally between the seat 18' for the seal and the annular rib 19.

Lastly, the automatic flow rate control valve 10 comprises a biasing spring 21, which acts to balance the force generated by the pressure of the fluid on the opposite side the control piston.

In the example shown, the biasing spring 21 is housed within a damping chamber 22 for damping the vibrations or pulsations of the control piston.

In particular, as can be seen from FIG. 2, the damping chamber 22 is defined between two opposite cup-shaped elements, in particular between the downwardly facing piston 16 and an upwardly facing cavity, defined by an inner cylindrical wall 23 coaxially arranged to the outer wall of the valve body, to provide an annular gap for sliding movement of the piston more precisely the wall 13 extends from the outlet 15 towards the piston 16, coaxially and inside the cylindrical wall 13 of the valve body 11. In this way, in addition to forming the damping chamber 22, an annular flow passage 24 for the fluid is simultaneously formed between the inlet apertures 14 and the outlet aperture 15, as shown. The opposite cylindrical surfaces of the valve body 11 and the inner walls 23, in addition to forming the annular passage 24 also provide guide means for the longitudinal movement of the piston 16.

The inner wall 23 of the valve body is made in one piece with the tubular body 11, being connected to the latter by means of three spokes 25 disposed at 120°, only one of which is shown in FIG. 2, or in any other suitable way. Therefore, both the valve body 11 and the control piston 16, thanks to their simple configuration, can be obtained simply by moulding from plastic material; in this way, not only is it possible to give the control valve or its parts any whatsoever configuration, but it is also possible to substantially reduce their manufacturing costs.

Moreover, the use of plastic material both for the valve body and the control piston helps to reduce the noise during operation of the control valve.

In order to allow the movement of the piston 16 and to dampen the vibrations, it is necessary for the damping chamber 22 to be in communication with the flow path 24 inside the valve itself. Consequently, as shown in the detail of FIG. 4, between the inner surface 19A of the annular rib 19 of the control piston 16, and the outer surface 23' of the inner wall 23 of the valve body 11, there is a narrow annular slit 27A or slits 27B which enable communication between the damping chamber 22 and the inner flow passage 24 for the fluid.

The communication between the damping chamber 22 and the flow passage 24 for the fluid could be differently shaped, for example by providing the internal surface of the ribbing 19 with a plurality of small longitudinal slits 27B, or vice versa, or in any other suitable way, as shown in FIG. 5.

To prevent the piston 16 from being pushed by the spring 21, outside the tubular body 11 of the valve, use has been made of a small U-shaped stop clip 26, suitably shaped to be seated into a circumferential slit 28, on one side of the outer wall of the valve body 11, to engage by the two legs 26A with opposite detents 29 on both sides of the valve body 11, as shown. The detents 29 have a slanted upper surface 29', FIG. 1, which facilitate the snap-on engagement of the two legs 26B of the stop clip 26.

Figure 6:
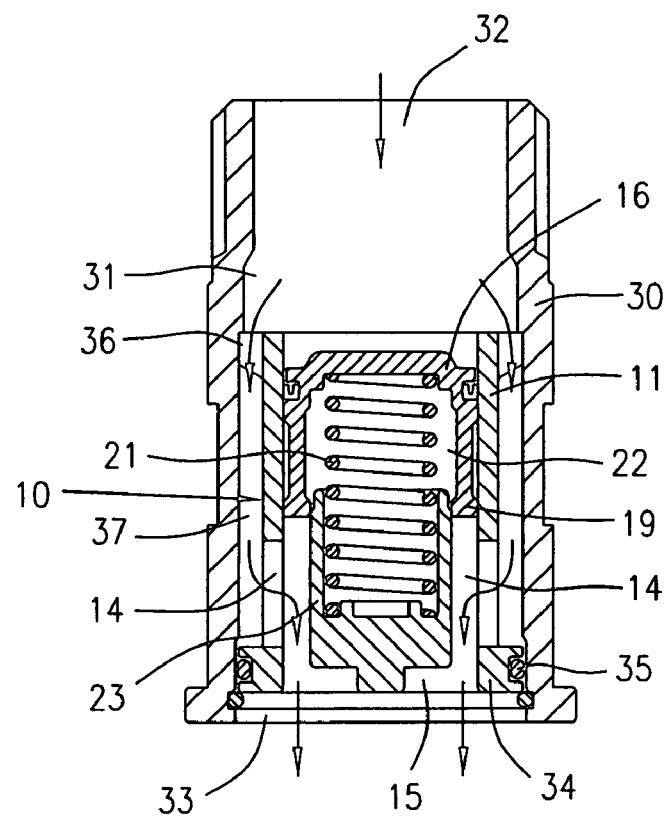
FIG. 6 shows a first assembly comprising the valve of FIG. 1.
Figure 7:
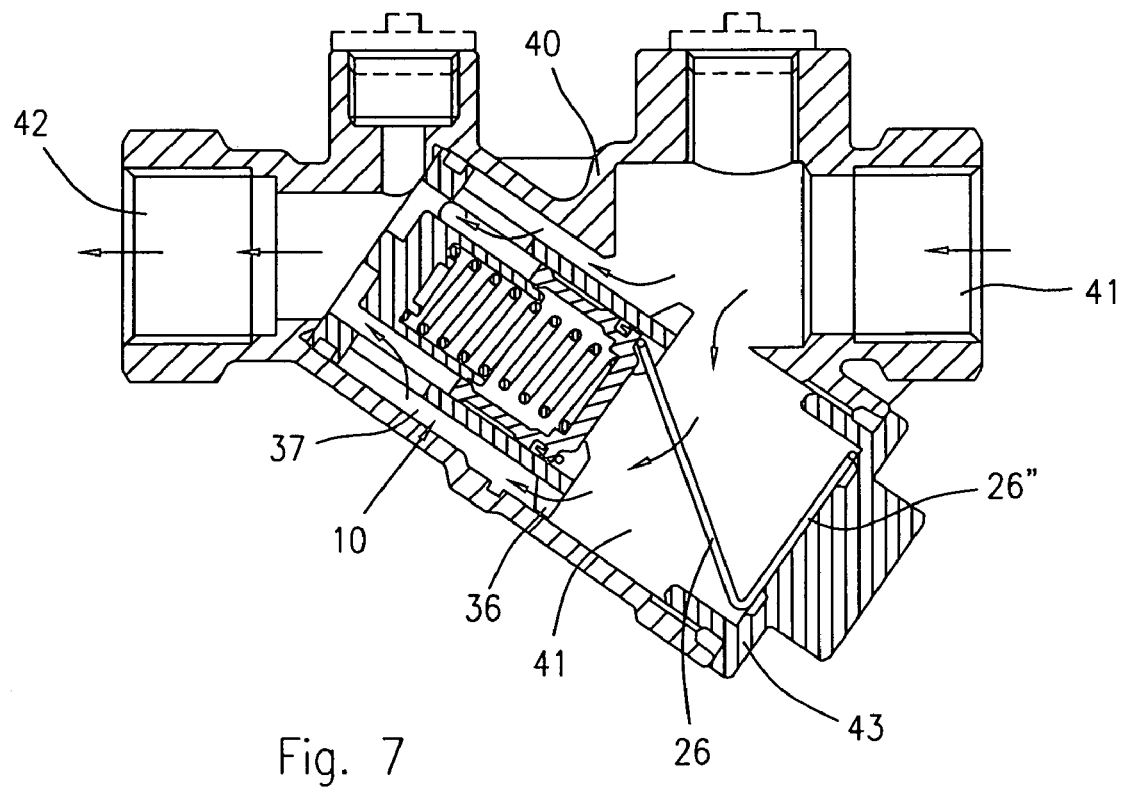
FIG. 7 shows a second assembly comprising the valve of FIG. 1.

The valve 10 may be in the form of a cartridge insertable into a respective housing, of a duct, tubular connecting element or hydraulic assembly, as shown by way of example in FIGS. 6 and 7 of the drawings, where the same reference numbers as in the preceding figures have been used to indicate similar or equivalent parts.

In particular, FIG. 6 shows a tubular pipe fitting 30 provided with a seat 31 for housing the cartridge of the automatic control valve 10. The valve 10 is tightly disposed into the seat 31 so as to prevent a direct flow passage for the fluid between both ends 32 and 33 of the pipe fitting, while allowing the flow passage through the valve 10 only.

Therefore, the valve body 11, in correspondence with its outlet end 15, is provided with an annular seat 34 for a seal 35.

The body 11 of the valve, for example in correspondence with its fore end, opposite the fluid outlet, or in any other suitable position, is provided with radial protrusions 36 which cooperate with the annular flange 34, to maintain the valve body 11 centred in the seat 31 of the pipe fitting 30.

Since the inner diameter of the outer cylindrical surface 13 of the valve body 11 is smaller than the diameter of the inner cylindrical surface of the seat 31, an annular passage 37 is formed between the two facing surfaces, on the outside of the valve body, which allows the passage of the fluid towards the inlet apertures 14, without flowing through the control piston 16 and the damping chamber 22; in this way it is possible to prevent any variation in the flow and other external factors from causing fluctuations and/or vibrations, with the consequent elimination of any cause of noise.

With reference to FIG. 6, the valve 10 operates as follows: the fluid which enters from the end 32 of the pipe fitting 30 is diverted by the valve 10 towards the annular path 37, and then enters through the inlet apertures 14 towards the outlet 15 of the valve at the other end 33 of the pipe fitting 30.

Simultaneously, the pressure of the fluid which acts on the piston member 16, pushes the latter forward, against the force of the biasing spring 21, until reaching a balanced condition in which the annular rib 19 of the piston 16 has partially choked the inlet apertures 14 with an area of the flow passage capable of achieving the desired flow rate.

If, for any cause the pressure and therefore the flow rate of the fluid tends to change, the combined and opposite actions of the pressure and the biasing spring, will move the piston 16 forward or backward, bringing it to rest in a new balanced position corresponding to a new flow passage area through the inlet apertures 14, so as to maintain the flow rate at a constant value; any fluctuations and/or vibrations of the valve will be eliminated thanks to the hydraulic damping of the fluid contained in the damping chamber 22.

Several tests have been conducted with different types of biasing springs 21 and seals 18, for different values of flow rate and pressure. During all the tests a regular behaviour of the valve was observed together with a satisfactory regulation of the flow rate at the design value.

Figure 8:
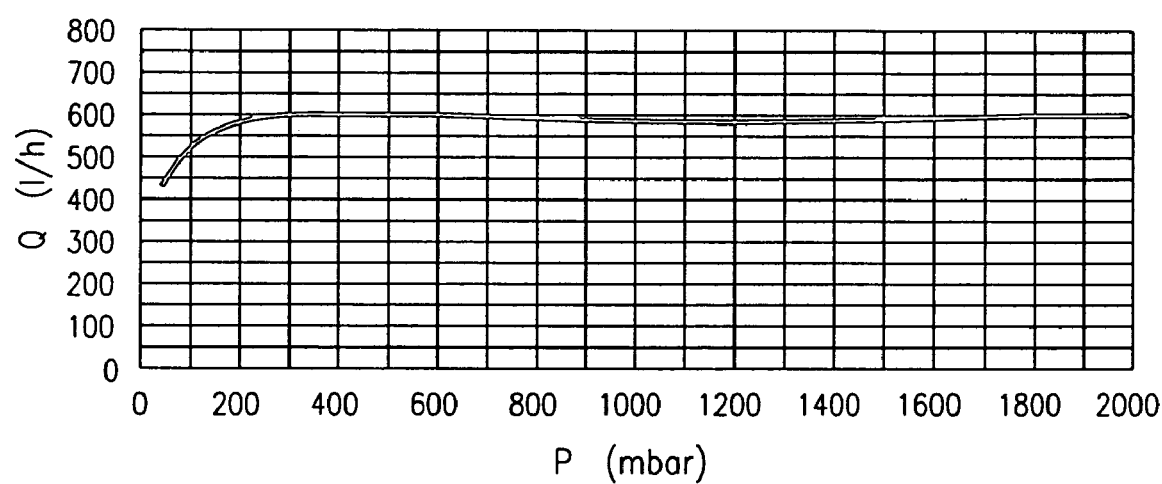
FIG. 8 is a graph showing the flow rate trough the valve for a large pressure range.

The graph in FIG. 8 shows a typical trend of the flow rate, in relation to the pressure for a control valve according to the invention; from said figure it can be seen that the value Q (l/h) of the flow rate, as the pressure P varies, has a substantially rectilinear trend and a substantially constant value within a wide working range, with total absence of fluctuations.

FIG. 7 of the drawings shows another possible application of a cartridge-type valve according to the invention.

Again, in FIG. 7 the same reference numbers as in the preceding figures have been used to indicate similar or equivalent parts.

In the case of FIG. 7, the casing 40 of the pipe fitting comprises a slanted seat 41 for the valve 10, on one side of the pipe fitting itself, between the inlet end 41 and the outlet end 42, to enable the valve 10 to be inserted and removed or to be inspected and replaced, by removing a plug 43.

In this case, the valve 10 is locked in the seat 41 by means of a spring 26 which extends rearwardly from the valve body, ending with an annular ring 26" to rest against the closing plug 43.

From what has been described and shown, with reference to figures it will be clear that the invention is addressed to a new type of control valve for stabilising to a constant value the flow rate of a hydraulic fluid, and to a valve assembly comprising a tubular housing and a control valve of the aforementioned type. Therefore, other modifications or variations may be made to the housing and to the control valve or their parts, without thereby departing from the scopes of the claims.

The invention claimed is:

1. An automatic control valve for stabilising the flow rate of a hydraulic fluid, comprising:
    a tubular valve body defining an inner flow passage between at least one inlet aperture and an outlet aperture of the tubular body;
    a flow control piston, axially movable within said tubular body; and
    a biasing spring to urge the control piston in an open condition against the pressure of the fluid,
    wherein said inlet aperture extends completely through a side wall of said valve body from the inner flow passage to an exterior of said valve body, said inlet aperture extending longitudinally in the valve body towards the fluid outlet end; and
    wherein the control piston comprises a cup-shaped element slidably movable between the outer wall of the valve body and a coaxially arranged guide member having a wall which extends from the fluid outlet end into the piston member;
    said piston member and guide member defining a damping chamber being in communication with said inner flow passage.

2. The automatic control valve according to claim 1, wherein the fluid inlet aperture progressively narrows in the direction of the outlet aperture.

3. The automatic control valve according to claim 2, wherein the inlet aperture, at its narrowed end comprises an aperture.

4. The automatic control valve according to claim 1, wherein the biasing spring is housed in the damping chamber, between the control piston and a bottom wall of the guide member.

5. The automatic control valve according to claim 1, wherein the control piston comprises an annular edge at a rear end for sealing, and for choking the fluid inlet aperture.

6. The automatic control valve according to claim 5, wherein the control piston comprises an annular seat for a seal at a fore end, and a plurality of longitudinal sealing ribs which extend between said annular seat and the annular edge.

7. The automatic control valve according to claim 1, comprising removable stop means for the control piston, in a position opposite to the fluid outlet end of the valve body.

8. The automatic control valve according to claim 7, wherein the stop means for the control piston includes a retaining clip member at the fore end of the tubular body of the control valve.

9. The automatic control valve according to claim 7, wherein said stop element comprises a U-shaped spring engaged into a cross slit on a side of the valve body, and to detent means on the opposite sides of the valve body.

10. A valve assembly comprising a tubular fitting having inlet and outlet ends for the fluid, and an automatic control valve according to claim 1, said control valve being in the form of a cartridge; and a seating in the tubular fitting for housing the control valve.

11. The valve assembly according to claim 10, wherein the tubular fitting is provided with an annular slot and a sealing member at the fluid outlet end.

12. The valve assembly according to claim 10, wherein the valve body comprises a plurality of radially extending protrusions at the fore end, and wherein an annular passage is provided between the valve body and the seating for the control valve which extends from the inlet end of the tubular fitting and a side inlet aperture of the valve body of the control valve.

13. The valve assembly according to claim 10, wherein the seating for the control valve is coaxially disposed to tubular fitting of the assembly.

14. The valve assembly according to claim 10 wherein the seating for the control valve is arranged on a side of the tubular fitting of the assembly.

15. The valve assembly according to claim 14, wherein a stop spring is provided between the control valve and a plug member for the seating for the control valve.

16. An automatic control valve for stabilising the flow rate of a hydraulic fluid, comprising:
   a tubular valve body having a cylindrical side wall, a pressure signal aperture at an up-stream open end of said valve body, an inlet aperture extending completely through said side wall and in communication with said pressure signal aperture outside of said valve body, and a fluid outlet at a down-stream end of said valve body, said inlet aperture extending longitudinally to define a slot through said side wall;
   a flow control piston that is axially movable within said valve body and that has an opening at a down-stream end;
   an inner guide wall coaxial with said flow control piston and defining an annular flow path between said inlet aperture and said fluid outlet; and
   a biasing spring that urges said control piston toward said pressure signal aperture to open said inlet aperture,
   wherein said flow control piston is axially movable between said side wall of said valve body and said inner guide wall, and
   wherein said flow control piston and said inner guide wall define a damping chamber in communication with said annular flow path through said opening.

17. The automatic control valve according to claim 16, wherein said inlet aperture is wider at an up-steam than at a down-stream end.

18. An automatic control valve for stabilising the flow rate of a hydraulic fluid, comprising:
   a tubular valve body having a cylindrical wall, a pressure signal aperture at an up-stream open end of said valve body, an inlet slot that extends transversely completely through said wall, and a fluid outlet at a down-stream end of said valve body;
   an inner guide wall coaxial with said wall and defining an annular flow path between said inlet slot and said fluid outlet;
   a flow control piston that is axially movable within said valve body on said inner guide wall, said piston having an up-stream portion exposed to said pressure signal aperture; and
   a biasing spring that urges said control piston toward said pressure signal aperture to open said inlet slot,
   wherein said flow control piston and said inner guide wall define a damping chamber in communication with said annular flow path.

19. The automatic control valve according to claim 18, wherein said inlet slot is generally T-shaped with an up-steam end transverse to a longitudinal direction of said valve body and a down-stream end in the longitudinal direction.

* * * * *